United States Patent Office 3,405,090
Patented Oct. 8, 1968

3,405,090
ULTRAVIOLET LIGHT STABLE POLY-α-OLEFIN COMPOSITION
Gordon C. Newland and Gerald R. Lappin, Kingsport, Tenn., assignors to Eastman Kodak Company, Rochester, N.Y., a corporation of New Jersey
No Drawing. Original application Jan. 4, 1963, Ser. No. 249,311. Divided and this application Dec. 16, 1966, Ser. No. 619,097
5 Claims. (Cl. 260—45.85)

ABSTRACT OF THE DISCLOSURE

A polyolefin composition containing a stabilizing amount a phenyl salicylate selected from the group consisting of p-(1,1,3,3-tetramethylbutyl)phenyl 5-(1,1,3,3-tetramethylbutyl)salicylate, p-t-dodecylphenyl-4-t-butylsalicylate, p-nonylphenyl-5-t-butylsalicylate, and p-t-butylphenyl-4-dodecyloxysalicylate.

---

This is a division of Ser. No. 249,311, filed Jan. 4, 1963, now abandoned.

This invention relates to poly-α-olefins. More particularly, it relates to the problem of stabilizing poly-α-olefins relative to ultraviolet light.

Normally solid poly-α-olefin such as the well known normally solid polyethylene and crystalline polypropylene are thermoplastic, synthetic resins which have gained widespread use as materials of construction. However, as is well known, normally solid poly-α-olefins undergo a photochemical degradation when exposed to ultraviolet light. This effect is frequently termed weathering. It appears to be a photooxidation process which causes rupture of the polymer chains and formation of carbonyl ($=C=O$) groups. As this degradation progresses, articles manufactured from poly-α-olefins tend to crack, become brittle and lose tensile strength to the extent of mechanical failure.

This invention provides a solution to this problem.

In summary, this invention comprises a normally solid plastic composition consisting essentially of a normally solid, α-olefin resin portion and at a protective concentration relative to ultraviolet light a phenyl salicylate selected from the group consisting of p-(1,1,3,3-tetramethylbutyl)phenyl 5-(1,1,3,3-tetramethylbutyl)salicylate, p-t-dodecylphenyl 5-t-butylsalicylate, p-nonylphenyl 5-t-butylsalicylate, p-t-butylphenyl-4-dodecyloxysalicylate.

The normally solid, α-olefin resin portion of the normally solid plastic composition of this invention consists essentially of at least one, normally solid, α-olefin polymer. Such a polymer, commonly referred to generically as a poly-α-olefin is one which is derived from an α-monoolefinic hydrocarbon having 2-10 carbon atoms. Such a polymer is provided by the normally solid homopolymers of α-monoolefinic hydrocarbons having generally 2-10 carbon atoms, preferably 2-6 carbon atoms and usually 2-4 carbon atoms. It is also provided by the normally solid copolymers (which include graft polymers, addition polymers, block polymers and the like) of α-monoolefinic hydrocarbons having generally 2-10 carbon atoms, preferably 2-6 carbon atoms and usually 2-4 carbon atoms, as well as of these α-monoolefinic hydrocarbons and other compounds. Examples of a normally solid polymer derived from an α₅monoolefinic hydrocarbon having 2-10 carbon atoms include the linear and branched, low density and high density, crystalline and amorphous, normally solid, homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allyl benzene, and the like. Processes for preparing a normally solid α-olefin polymer are well known and described in detail in the prior art. See, for example, the U.S. Patent No. 2,153,553, to Fawcett et al., the U.S. Patent No. 2,912,429, to Cash and the U.S. Patent No. 2,917,500, to Hagemeyer et al. In general, a normally solid, α-olefin polymer, is a thermoplastic material which at 20° C. is solid. It includes the so-called poly-α-olefin waxes which usually have average molecular weights in a range from about 3,000 to about 12,000.

The normally solid, α-olefin resin portion of the poly-α-olefin composition of this invention, in addition to at least one normally solid, α-olefin polymer, can also comprise other polymeric components. Thus, it can comprise a normally solid polymer derived from another α-monoolefinic hydrocarbon having 2-10 carbon atoms. It can comprise a different kind of polymer, generally present as a physical property improver.

The normally solid, poly-α-olefin composition of this invention can also comprise other additives such as, for example, antioxidants, thermal stabilizers, anticorrosion additives, antistatic agents, foaming agents, plasticizers, colorants such as dyes and pigments, waxes, mold release agents, slip agents, anti-blocking agents, fillers, extenders, and the like, including physical property improvers other than polymeric compounds.

The phenyl salicylates of this invention are compounds which are readily prepared. Each one is made by reacting one chemical equivalent of the corresponding salicylic acid with one chemical equivalent of the corresponding phenol with the aid of three chemical equivalents of phosphorous oxychloride at a temperature in a range from about 120 to about 150° C. and for about 1–5 hours. Characteristic physical properties of these new phenyl salicylates are:

| Phenyl Salicylate | Physical State at 20° C. | Melting Point or Boiling Point |
| --- | --- | --- |
| p-Nonylphenyl 5-t-butyl salicylate. | Viscous liquid | B.P. 185–190° C. at 0.1 mm. Hg. pressure. |
| p-(1,1,3,3-tetramethyl-butyl)phenyl 5-(1,1,3,3-tetramethylbutyl) salicylate. | Solid | M.P. 88–90° C. |
| p-t-Butylphenyl 4-dodecyl-oxysalicylate. | ...do | M.P. 75–80 °C. |

Concentration of a phenyl salicylate of this invention in the normally solid plastic composition in general depends upon the degree of ultraviolet light stabilization desired. This, in turn, depends upon a number of factors including subsequent environmental conditions to which the plastic composition is intended to be exposed. In general, a concentration of a phenyl salicylate of this invention in a range from about 0.1 to about 10% by weight of the total α-olefin polymeric content of the composition is an effective concentration for most end uses of the composition and gives satisfactory results.

The normally solid plastic composition of this invention is made by incorporating at least one of the phenyl salicylates of this invention into the normally solid resin portion of the composition. Generally, such incorporation is performed by any one of a number of known methods, such as roll compounding, extrusion, solvent mixing and the like, which will result in a uniform dispersion of the phenyl salicylate in the resin portion. For example, such incorporation can be performed by heating or otherwise softening the normally solid resin portion to a workable consistency and then working in, as by roll compounding, the phenyl salicylate until a substantially uniform blend or dispersion is obtained. Generally, such incorporation takes place at the same time that other additives are normally incorporated into the resin portion of the composition and usually along with such other additives as the particular poly-α-olefin composition formulation may require.

The plastic composition of this invention is useful in coatings and as a material of construction for shaped articles. Thus, specific embodiments of the composition can be made into various shaped articles such as, for example, pellets, sheeting, films, bars, tubes, filaments, fibers, specially shaped structural elements and the like as by conventional casting and molding techniques which include extrusion, blow molding and the like.

This invention is further illustrated by the following examples of various aspects thereof, including specific embodiments of the invention. This invention is not limited to these specific embodiments unless otherwise indicated.

EXAMPLE 1

This example illustrates the synthesis of p-(1,1,3,3-tetramethylbutyl)phenyl 5 - (1,1,3,3 - tetramethylbutyl) salicylate.

25 grams (0.1 mole) of 5-(1,1,3,3-tetramethylbutyl) salicylic acid, 20.6 grams (0.1 mole) of p-(1,1,3,3-tetramethylbutyl)phenol and 6 grams (0.3 mole) of phosphorous oxychloride are admixed and heated to a temperature of 130–140° C. This temperature is maintained for 2 hours. Thereafter, the resulting reaction mixture is poured into water. The crude product is separated as by filtration, and then recrystallized from ethanol in the form of white needles. A typical yield of the recrystallized product under these conditions is 26 grams (0.06 mole). The recrystallized product has a typical melting point of 88–90° C.

EXAMPLES 2–5

These examples illustrate specific embodiments of a polyethylene composition of this invention.

The formulations of these specific embodiments are:

EXAMPLE 2.—FORMULATION

| Components | Concentration in parts by weight |
|---|---|
| Normally solid polyethylene | 100 |
| p-(1,1,3,3-tetramethylbutyl)phenyl 5-(1,1,3,3-tetramethylbutyl)salicylate | 1 |

EXAMPLE 3.—FORMULATION

| Components | Concentration in parts by weight |
|---|---|
| Normally solid polyethylene | 100 |
| p-Nonylphenyl 5-t-butylsalicylate | 1 |

EXAMPLE 4.—FORMULATION

| Components | Concentration in parts by weight |
|---|---|
| Normally solid polyethylene | 100 |
| p-t-Dodecylphenyl 5-t-butylsalicylate | 1 |

EXAMPLE 5.—FORMULATION

| Components | Concentration in parts by weight |
|---|---|
| Normally solid polyethylene | 100 |
| p-t-Butylphenyl 4-dodecyloxysalicylate | 1 |

The specific polyethylene compositions according to these formulations are prepared by hot roll compounding the components for 4 minutes, the temperature of the front roll being held at 270° F. and the temperature of the rear roll being at 220° F. The resulting roll mix can then be compression molded into flat plates, sheets and the like.

EXAMPLES 6–9

These examples illustrate specific embodiments of a polypropylene composition of this invention.

The formulations of these specific embodiments are:

EXAMPLE 6.—FORMULATION

| Components | Concentration in parts by weight |
|---|---|
| Normally solid polypropylene | 100 |
| p-(1,1,3,3-tetramethylbutyl)phenyl 5-(1,1,3,3-tetramethylbutyl)salicylate | 1 |

EXAMPLE 7.—FORMULATION

| Components | Concentration in parts by weight |
|---|---|
| Normally solid polypropylene | 100 |
| p-t-Dodecylphenyl 5-t-butylsalicylate | 1 |

EXAMPLE 8.—FORMULATION

| Components | Concentration in parts by weight |
|---|---|
| Normally solid polypropylene | 100 |
| p-Nonylphenyl 5-t-butylsalicylate | 1 |

EXAMPLE 9.—FORMULATION

| Components | Concentration in parts by weight |
|---|---|
| Normally solid polypropylene | 100 |
| p-t-Butylphenyl 4-dodecyloxysalicylate | 1 |

The specific compositions of the foregoing formulations are made by admixing the components for 5 minutes at 325° F. under a nitrogen atmosphere in a C. W. Brabender plastograph. The resulting slab is granulated. The granules thus obtained can then be injection molded into plates, films and the like.

EXAMPLES 10–13

These examples illustrate specific embodiments of a poly(1-butene) composition of this invention.

The formulations of these specific compositions are as follows:

EXAMPLE 10.—FORMULATION

| Components | Concentration in parts by weight |
|---|---|
| Normally solid poly(1-butene) | 100 |
| p - (1,1,3,3 - tetramethylbutyl)phenyl 5 - (1,1,3,3-tetramethylbutyl)salicylate | 1 |

EXAMPLE 11.—FORMULATION

| Components | Concentration in parts by weight |
|---|---|
| Normally solid poly(1-butene) | 100 |
| p-t-Dodecylphenyl 5-t-butylsalicylate | 1 |

EXAMPLE 12.—FORMULATION

| Components | Concentration in parts by weight |
|---|---|
| Normally solid poly(1-butene) | 100 |
| p-Nonylphenyl 5-t-butylsalicylate | 1 |

EXAMPLE 13.—FORMULATION

| Components | Concentration in parts by weight |
|---|---|
| Normally solid poly(1-butene) | 100 |
| p-t-Butylphenyl 4-dodecyloxysalicylate | 1 |

The specific compositions of the foregoing formulations are prepared by hot roll compounding the components for 4 minutes with the front roll temperature being at 240° F. and the rear roll temperature being at 185° F. The resulting roll mix in each case can then be compression molded into plates, sheeting and the like.

Samples of specific embodiments of the poly-α-olefin composition of this invention have actually been prepared and tested. The tests employed are described as follows.

Artificial weathering tests

In these tests, specimens of the sample were exposed to ultraviolet light in a modified Atlas Twin-Arc Weather-Ometer [Anal. Chem., 25, 460 (1953)], and thereafter various measurements and observations, depending on the test, were made on them.

Artificial weathering stress crack test

In this test three specimens of the sample were bent into U shape and, while so bent, were inserted upside down into a channel. The channel was placed into the modified weatherometer and the specimens were periodically observed for the development of cracks visible under 3× magnification.

When such cracks developed in a specimen, the exposure time to bring about this condition for that specimen was calculated. When each of the specimens of a sample had developed such cracks, the stress-crack life of the sample was then determined. This is the average exposure time required for all three specimens to develop these cracks.

In addition, when such cracks had developed in the specimens, they were inspected for change in color as well as for "blooming" or exudation of the phenyl salicylate.

Embrittlement test

In this test thin film specimens of the sample were placed into the modified weatherometer. Periodically a specimen was removed and inspected for embrittlement when creased with the exposed side of the film specimen on the outside of the crease. When brittleness of a specimen was detected, the exposure time required to reach this condition was determined.

Tensile elongation test

In this test, specimens of the sample under test were placed into the modified weatherometer. Frequently, a specimen was removed and measured by the usual means for tensile elongation. When elongation was reduced to 100%, the exposure time required to reach this condition was determined.

Carbonyl formation test

Specimens of the sample under test were placed into the modified weatherometer. Frequently, a specimen was removed and analyzed by the usual procedure for carbonyl formation. When 15 arbitrary units of carbonyl content were found, the exposure time required to reach this condition was determined.

Outdoor weathering tests

In these tests, specimens of the sample were exposed outdoors at Kingsport, Tenn., on a rack adapted to position the specimens at an angle of 36.5° to the horizontal.

Outdoor stress crack test

In this test, ten specimens of the sample under test were bent into U shape and, while so bent, were inserted upside down into a channel. The channel was then placed on an outdoor rack. Periodically, the specimens were inspected for cracks visible to the unaided eye.

When cracks visible to the unaided eye were present in five of the ten specimens, the exposure time for the samples to reach this condition was determined.

In addition, when this condition was reached, the specimens were inspected for change in color and for "blooming" or exudation of the phenyl salicylate.

Outdoor discoloration test

A speciment of the sample under test was placed on an outdoor rack. After six months' exposure, the specimen was inspected for change in color.

Tensile elongation test

A specimen of the sample, after measurement of elongation, was placed in an outdoor rack for one year. It was then again measured for elongation. The percent loss in initial elongation was then calculated.

Carbonyl formation test

This test was the same as that under the Artificial Weathering Tests section, except that the specimens were exposed outdoors on an outdoor rack. Specimens were also observed for color change and exudation when the 15 arbitrary units of carbonyl were detected.

Volatilization test

A film 2 mils thick is compression molded from a 125 mils thick plate of the sample under test. The film is then examined by ultraviolet spectroscopy and the concentration of the phenyl salicylate present in the film calculated. In such fashion, the loss of the phenyl salicylate during compounding and molding is ascertained.

Tables I and II summarize the results of carrying various ones of these tests on samples of specific polyethylene compositions including specific embodiments of a polyethylene composition of this invention. The samples were made in accordance with the procedure following the Examples 2–12 formulations. They were thus made from a conventional low density polyethylene of melt index 2 and the additives indicated in the table. The concentration of the additive in each case was 1 part by weight per 100 parts by weight of the polyethylene. The resulting roll mix in each case was compression molded into flat plates 125 mils thick and 50 mils thick. For the Artificial Weathering Stress Crack Test, and the Outdoor Stress Crack Test, were indicated, the test specimens were cut from the 125 mils thick plates with the dimensions 1.5 inches by 0.5 inch, and 0.5 inch wide aluminum channels were employed. For both the Artificial Weathering and Outdoor Weathering Tensile Elongation, Carbonyl Formation the test specimens were cut from the 50 mils thick plates. For the Volatilization Test, the films were compression molded from the 125 mils thick plate.

Table I presents the data for the Artificial Weathering tests and for the Volatilization test.

TABLE I.—ARTIFICIAL WEATHERING TESTS

| Sample No. | Additive | Stress Crack Test | | | Tensile Elongation Test | Carbonyl Formation Test | | | Volatilization Test |
|---|---|---|---|---|---|---|---|---|---|
| | | Stress Crack Life in Hours | Color Formation | Exudation | Hours Required to Reduce Elongation 100% | Hours Required to Form 15 Units | Color Formation | Exudation | Loss in % by Weight |
| 1 | None | 330 | None | None | 200 | 100 | None | None | |
| 2 | p-(1,1,3,3-tetramethylbutyl) phenyl 5-(1,1,3,3-tetramethylbutyl) salicylate. | | | | 700 | 350 | Much | Very slight | 10 |
| 3 | p-t-Dodecylphenyl 5-t-butyl-salicylate. | | | | 3,000 | 1,080 | Some | None | |
| 4 | p-Nonylphenyl 5-t-butylsalicylate | | | | 1,800 | 910 | Slight | do | |
| 5 | p-t-Butylphenyl 4-dodecyloxy-salicylate. | | | | 3,600 | 980 | Very slight | Some | |

Samples 2–5 correspond to the formulations of Examples 2, 4, 3 and 5, respectively.

Table II presents the data for the Outdoor Weathering tests.

each case was 1 part by weight of additive per 100 parts by weight of resin. In each case, the roll mix of each test sample was compression molded into flat plates 125 mils thick. For the Artificial Weathering Stress Crack

TABLE II

| Sample No. | Additive | Outdoor Weathering Tests | | | | |
|---|---|---|---|---|---|---|
| | | Loss in Percent of Initial Elongation in One Year | Stress Crack Life in Months | Time in Months to Formation of 15 Carbonyl Units | Color Formation | Exudation |
| 1 | None | 77 | 12 | 1.5 | None | None. |
| 2 | p-(1,1,3,3-tetramethylbutyl)phenyl 5-(1,1,3,3-tetramethylbutyl)-salicylate. | 0 | >53 | 10 | Much | Very slight. |
| 3 | p-t-Dodecylphenyl 5-t-butylsalicylate | | >26 | | Some | None. |
| 4 | p-Nonylphenyl 5-t-butyl-salicylate | | >26 | | do | Do. |
| 5 | p-t-Butylphenyl 4-dodecyloxysalicylate | | >26 | | Slight | Some. |

In Table II, samples 2–5 correspond to the formulations of Examples 2, 4, 3 and 5, respectively.

The data of Tables I–II show that the phenyl salicylates of this invention are highly effective ultraviolet light stabilizers for polyethylene.

Table III summarizes the results obtained in the testing of samples of specific polypropylene compositions. The samples were prepared from a conventional, crystalline polypropylene containing the antioxidants butylated hydroxytoluene and dilauryl 3,3'-thiodipropionate, each at a concentration of about 0.1% by weight of the propylene polymer. The samples were prepared in accordance with the procedure described at the end of the Examples 6–9 formulations, from this normally solid polypropylene and the additional additives indicated in Table III, the concentration of the indicated additional additives being 1 part by weight per 100 parts by weight of the crystalline polypropylene. The plastograph slab in each case was granulated and injection molded into tensile bars each of which was 0.0625 inch thick, 2.5 inches long and 0.5 inch wide at the ends with a neck section 1.0 inch long and 0.25 inch wide.

For the Embrittlement Test, the tensile bars were compression molded into films 3 mils thick. For the Volatilization Test, the tensile bar specimens were compression molded into the 2 mils thick films. For all other tests, the tensile bar specimens were employed as obtained. In the Stress Crack tests, the channel was of stainless steel and 0.625 inch wide.

Test, test specimens 1.5 inches by 0.5 inch were cut from these plates and 0.5 inch wide channels were employed.

TABLE IV

| Sample No. | Additive | Artificial Weathering Test/Stress Crack Test | |
|---|---|---|---|
| | | Stress Crack Life in Hours | Exudation |
| 1 | None | 40 | None. |
| 2 | p-(1,1,3,3-tetramethylbutyl)-pehnyl 5-(1,1,3,3-tetramethylbutyl)salicylate | 252 | Do. |
| 3 | p-t-Dodecylphenyl 5-t-butyl-salicylate | 205 | Do. |
| 4 | p-Nonylphenyl 5-t-butyl-salicylate | 205 | Do. |
| 5 | p-t-Butylphenyl 4-dodecyloxy-salicylate | 134 | Do. |

Samples 2–5 correspond in formulation to the compositions of Examples 10–13.

These data illustrate that the phenyl salicylates of this invention are highly effective in protecting poly(1-butene) against the degradative effects of ultraviolet light. In this connection, p-(1,1,3,3-tetramethylbutyl)phenyl 5-(1,1,3,3-tetramethylbutyl)salicylate is outstanding.

Similar results are obtained with the phenyl salicylates of this invention and other $\alpha$-olefin polymers.

Thus, this invention provides poly-$\alpha$-olefin compositions protected to a high degree against the degradative effects of ultraviolet light.

TABLE III

| Sample No. | Additive | Artificial Weathering Tests | | | | | |
|---|---|---|---|---|---|---|---|
| | | Stress Crack Test | | | Embrittlement Test, Exposure Time In Hours | Outdoor Weathering Test, Color Formation After 6 Months | Volatilization Test, Loss in Percent by Weight |
| | | Stress Crack Life in Hours | Color Formation | Exudation | | | |
| 1 | None | 90 | None | None | 50 | None | |
| 2 | p-(1,1,3,3-tetramethylbutyl)phenyl 5-(1,1,3,3-tetramethylbutyl)-salicylate. | 1,660 | Much | do | | Light yellow | 30 |
| 3 | p-t-Dodecylphenyl 5-t-butylsalicylate | 705 | Slight | do | | | |
| 4 | p-Nonylphenyl 5-t-butylsalicylate | 690 | Very slight | do | 340 | | |
| 5 | p-t-Butylphenyl 4-dodecyloxysalicylate | 470 | Some | do | | | |

Samples 2–5 correspond in formulation (but are not the same as because of the antioxidants in the polypropylene employed in the samples) to the compositions of Examples 6, 7, 8, and 9, respectively.

The data of Table III demonstrate the outstanding effectiveness of the phenyl salicylates of this invention in protecting normally solid polypropylene from the degradative effects of ultraviolet light.

Table IV summarizes the results obtained in the testing of samples of specific poly(1-butene) compositions. The samples were prepared in accordance with the procedure described after the Examples 9–13 formulations from a conventional, normally solid poly(1-butene) having an inherent viscosity of 1.29, and, the additives indicated in the following Table IV. The additive concentration in While in certain instances it is desirable to have non-exuding, poly-$\alpha$-olefin compositions, in other instances where the finished article of the composition is not intended for handling and the like, the exudation of an additive from the composition is not only unobjectionable but desirable. In such instances weatherability of the stabilized composition is of prime importance. The presence of a permanent exudate on the surface of the article, when the exudate is an ultraviolet light stabilizer, acts as an ultraviolet light protective coating and adds to the stability of the composition. The phenyl salicylates of this invention have the advantage in such circumstances of being somewhat incompatible with poly-$\alpha$-olefins, whereby a protective exudate is formed by the corresponding poly-$\alpha$-olefin compositions of this invention.

Other features, advantages and specific embodiments of this invention will be readily apparent to those in the exercise of ordinary skill in the art after reading the foregoing disclosure. In this connection, while specific embodiments of this invention have been described in considerable detail, variations and modifications of these embodiments can be effected within the spirit and scope of the invention as disclosed and claimed.

The embodiments of the invention in which an exclusive property or privilege is claimed are defined as follows:

1. A thermoplastic composition comprising a normally solid poly-α-olefin resin portion and a stabilizing amount of a substituted phenyl-salicylate selected from the group consisting of
   (a) p-(1,1,3,3-tetramethylbutyl)phenyl 5-(1,1,3,3-tetramethylbutyl)-salicylate,
   (b) p-t-butylphenyl 4-dodecyloxy-salicylate.

2. A thermoplastic composition according to claim 1 wherein said poly-α-olefin is polypropylene.

3. A thermoplastic composition according to claim 1 wherein said poly-α-olefin is polyethylene.

4. A thermoplastic composition according to claim 1 wherein said poly-α-olefin is poly-1-butene.

5. A shaped article of the composition of claim 1.

References Cited
UNITED STATES PATENTS

| | | | |
|---|---|---|---|
| 3,033,814 | 5/1962 | Thilstrup | 260—45.85 |
| 3,043,797 | 7/1962 | Addleburg | 260—45.85 |
| 3,126,409 | 3/1964 | Arthen | 260—473 |

DONALD E. CZAJA, *Primary Examiner.*

V. P. HOKE, *Assistant Examiner.*